United States Patent Office 3,494,715
Patented Feb. 10, 1970

3,494,715
METHOD OF COLORING NATURALLY OCCURRING POROUS STONE
Clemens Streck, Loundonville, N.Y., assignor to GAF Corporation, New York, N.Y., a corporation of Delaware
No Drawing. Filed Dec. 30, 1965, Ser. No. 517,848
Int. Cl. D06p 5/00
U.S. Cl. 8—8          6 Claims

ABSTRACT OF THE DISCLOSURE

A process for artifically coloring naturally occurring porous stone which comprises applying thereto a solution comprising an oxidation base, a strong acid, a water-miscible solvent and water, allowing the solution to penetrate the interior of the porous stone, and treating the penetrated stone with an aqueous solution of an oxidizing agent to produce the desired color.

---

The present invention relates to a method of artificially coloring naturally occurring porous stone, and more particularly to a method of producing light-fast dyeings on such stones with oxidation colors.

There has been a great demand in the building industry for a stone which is vividly colored as well as possessing sufficiently high strength so that it may be used as a building material. However, since such stone occurs naturally in only a very limited number of localities, it is not readily available as a building material in most areas of the United States. Furthermore, transportation costs make the use of such naturally occurring colored stone prohibitive for a great many purposes. Additionally, in view of the fact that such natural stone occurs in only a limited number of vivid colors and hues, a great restriction is placed upon its commercial employment.

Any naturally occurring stone can be effectively dyed by the process of the present invention. The present process, however, is particularly suitable to the coloring of such materials as granite, dolomitic limestone, whitestone, dolomite, calcitic limestone, marble or aquatic animal shells, etc. Therefore, the term "porous stone" as used hereinafter shall represent any and all of such dyeable materials.

As a result of the disadvantages of the use of naturally occurring colored porous stone, there has been a great deal of experimentation to produce artifically colored stone economically having properties similar to those of naturally occurring colored stone.

Until now, this experimentation has been unsuccessful in producing an artificial stone with the properties of naturally occurring materials. The properties which have not been capable of being artificially reproduced are, for example, the vivid, intense color extending into the interior of a natural stone, high strength of naturally colored stone, high resistance to fading upon exposure to ultraviolet light, oxygen, and oxidizing agents, moisture and other elements of weathering.

Prior art processes for the production of artificially colored stone have involved a pretreatment for the purpose of removing the moisture of water content of the stone prior to any coloring step. After the vigorous pretreatment to remove tightly held water content, the stone was colored by contacting it with a solution of a dye to produce the artificially colored product. However, in all cases, the resultant product was quite unsatisfactory due to the low levels of color intensity that was capable of being produced by these processes, as well as due to a weakening of its crystalline structure and lowering of mechanical properties from the vigorous water removal.

In addition, the prior art processes did not result in satisfactory penetration and retention of the coloring matter throughout the stone. Furthermore, the vigorous pretreatment necessary to remove the moisture or water content from the stone to be artifically colored was economically disadvantageous in that expensive special equipment and a large amount of heat was required to produce the desired result.

Therefore, in view of the great disadvantages of prior known processes for producing artificially colored stone, the art has long sought an entirely satisfactory method for the coloring of naturally occurring stone so as to resemble the less available, more expensive natural product.

Applicant has unexpectedly found by the process of the present invention that stone can be artifically colored by applying thereto a solution which comprises an oxidation base, acid, a water-miscible solvent, and water. This solution is applied to the stone by any suitable method, and allowed to stand for a short period of time to allow penetration of the base into the interior of the stone and also to allow the water to evaporate. After the base has penetrated the stone, the stone is then treated with an oxidizing agent whereupon the desired color appears. After this color has fully developed, the stone may be then washed, buffed and finished as desired to enhance the appearance of the dyed material.

It is therefore a primary object of the present invention to provide a dyeing process for naturally occurring porous stone which is free from the deficiencies and disadvantages of heretofore utilized processes.

It is a further object of the present invention to provide a process for coloring stone whereby the properties of naturally occurring colored stone are simulated by the use of oxidation colors.

Still further object and advantages of the process of the present invention will become apparent from the following detailed description of the present invention.

The oxidation bases which can be used in accordance with the process of the present invention are any of the well known oxidation bases of the dyeing industry.

Suitable specific examples of the oxidation bases are as follows:

Aniline
p-Aminoacetaniline
o-Phenylenediamine
4-chloro-o-phenylenediamine
4-nitro-o-phenylenediamine
m-Phenylenediamine
4-chloro-m-phenylenediamine
4-nitro-m-phenylenediamine
4-methoxy-m-phenylenediamine
Toluene-2,5-diamine
Toluene-2,4-diamine
2-chlorotoluene-3,5-diamine
p-Phenlenediamine
2-chloro-p-phenylenediamine
2-nitro-p-phenylenediamine
N,N-dimethyl-p-phenylenediamine
3-(p-aminoanilino)-1,2-propanediol
N-phenyl-p-phenylenediamine
N-(o-methoxyphenyl)-p-phenylenediamine
4,4'-diaminodiphenylamine
Resorcinol
Pyrogallol
o-Aminophenol
m-Aminophenol
p-Aminophenol
Picramic acid
2-amino-4-nitrophenol p-(p-aminoanilino)phenol
1,5-naphthalenediamine
2-nitroso-1-naphthol
1,5-naphthalenediol The acid employed in the process of the present invention should be one that is generally regarded in the art as a strong acid. Such a material may be an inorganic acid such as, for example, sulfuric acid, hydrochloric acid, and phosphoric acid, etc., or an organic acid such as, for example, formic, acetic, propionic, butyric, glycolic, lactic, oxalic, and the like. The amount of acid employed in the dyeing solution should be sufficient to form the acid salt of the oxidation base and also to give an acid reaction medium. In general, about 2 to 6 parts of acid per part of base are employed in the dying solution.

The solvent used in the process of the present invention can be any conventional water-miscible solvent. The water-miscible solvents useful in the present invention may be illustrated as follows: methanol, ethanol, propanol, butanol, acetone, dimethyl formamide, ethylene glycol, Cellosolve, (ethyl ether of ethylene glycol), butyl Cellosolve (butyl ether of ethylene glycol), dimethylsulfoxide and the like. In general, the amount of water-miscible solvent and water correspond to about 3 to 15 parts of such solvent and water to 1 part of oxidation-base. More particularly, the amounts of such solvents are regulated to the desired concentration so that the oxidation base comprises about 1–15% of the total dyeing solution. The ratio of water to water-miscible solvent is not critical and can vary over a wide range. Moreover, more than one water-miscible solvent may be advantageously employed in the process of the present invention.

The oxidizing agent may be any of the type which are normally used for producing oxidation colors, such sodium chlorate, potassium chlorate, ferric chloride, sodium dichromate and the like. Hydrogen peroxide has been found to be especially effective and easy to use. After the stone has been treated with the base, the stone is treated wih a hydrogen peroxide solution, the concentration of which may range from about 10–35%. It has also been desirable to have a catalyst present in the peroxide solution. The catalyst is present only in small amounts, i.e., about 0.1–2.0%. Ammonium vanadate, ferric chloride, ferrous sulfate, cupric sulfate exemplify such catalists.

The amount of oxidizing solution that is employed in treating the base penetrated stone in accordance with the present invention is not critical. It is only necessary to apply the oxidizing solution until and in such amount that the desired color develops.

In carrying out the dyeing process of the present invention the oxidation base solution is brushed, sprayed, wiped or applied to the stone in any other suitable manner. After allowing penetration, usually 15 minutes to 5 hours, depending on the type of stone, etc., the solution of oxidizing agent, preferably aqueous hydrogen peroxide and also preferably containing a suitable catalyst, is brushed, sprayed or wiped on, etc. The color begins to develop immediately. After about 15 minutes to 5 hours, the stone may be washed, buffed, and finished as desired.

It is important to note that the dying process of the present invention does not necessitate a pretreatment step for the removal of water. This, therefore, is a great advantage over previously employed dyeing methods. Moreover, by the process of the present invention, dyeing of exceptional light fastness are produced along with an unusual insensitivity to solvents and acids. Therefore, in addition to the use of these materials as building stone, etc., the products produced by the process of the present invention have found outstanding utility as plates for mounting certain types of machinery found in commercial installations because of their unusual insensitivity to solvents, acids, etc. Of course, the products of the present invention can be used for buildings, gravestones, etc., or any other special use where strength and coloring are desired.

The following specific examples illustrate various embodiments of the present invention. Such examples are illustrative only, and are not to be deemed as limiting the invention set forth in the foregoing specification and appended claims:

EXAMPLE I

The following solution was prepared:

| | | |
|---|---|---|
| 4-aminodiphenylamine | g | 4 |
| Lactic acid | cc | 2 |
| Gl. acetic acid | cc | 2 |
| Alcohol | cc | 10 |

To this were added 10 cc. of warm water which formed a solution almost instantly.

This solution was sprayed onto a granite block and it is allowed to stand for 20 minutes. The surface was then sprayed with a 17.5% solution of hydrogen peroxide which contained 0.5% of ammonium vanadate. The color formed immediately.

The granite was then washed well, buffed, and finished.

The granite was then washed well, buffed, and finished. which had a high degree of light fastness, and was highly impervious to color change on contact with acid and oils.

EXAMPLE II

The granite was then washed well, buffed, and finished.

| | | |
|---|---|---|
| 4-aminodiphenylamine | g | 2 |
| Hydrochloric acid | cc | 4 |
| Cellosolve | cc | 10 | to which was added 10 cc. of warm water.

A dyeing made according to the method of Example I resulted in a similar black dyeing.

EXAMPLES III–VII

The following examples were made in the manner of Example I:

| Example | Base | Color |
|---|---|---|
| III | p-Phenylenediamine | Grayish black. |
| IV | 2-chloro-p-phenylenediamine | Brownish black. |
| V | p-(p-Aminoanilino)phenol | Bluish gray. |
| VI | Aniline | Grayish black. |
| VII | N,N-dimethyl-p-nitrosoaniline | Do. |

In all cases the dyeings produced exhibited an extremely high degree of light fastness, and were highly resistant to color change when tested by contact with acids and oils.

While various embodiments have been set forth by way of illustrative examples, it is to be understood that the present invention is not to be deemed to be limited thereto, but should be construed as broadly as all or any equivalents thereof.

What is claimed is:

1. A process for artifically coloring naturally occurring porous stone which comprises applying thereto a solution comprising an oxidation base, a strong acid, a water-miscible solvent and water, allowing the solution to penetrate the interior of the porous stone, and treating the penetrated stone with an aqueous solution of an oxidizing agent to produce the desired color.

2. The process of claim 1 wherein the oxidation base comprises about 1–15% by weight of the total solution, the acid is employed in an amount sufficient to form the acid salt of the oxidation base and to yield an acid reaction medium, and the water and water-miscible solvent are present in about 3–15 parts by weight per part of oxidation base.

3. The process of claim 2 wherein the oxidizing solution additionally contains a small amount of an oxidation catalyst.

4. The process of claim 2 wherein the oxidizing solution comprises a 10–35% by weight hydrogen peroxide solution.

5. The process of claim 4 wherein the porous stone is granite.

6. The process of claim 2 wherein the oxidizing agent is selected from the group consisting of sodium chlorate, potassium chlorate, ferric chloride, sodium dichromate and hydrogen peroxide.

References Cited

UNITED STATES PATENTS

| 113,127 | 3/1871 | Zengeler | 8—8 |
| 1,293,832 | 2/1919 | McDonough | 8—8 |
| 1,350,600 | 8/1920 | Fourneaux | 8—32 |

DONALD LEVY, Primary Examiner

U.S. Cl. X.R.

8—32